(12) United States Patent
Richards et al.

(10) Patent No.: US 11,875,544 B2
(45) Date of Patent: Jan. 16, 2024

(54) ANNOTATION OF INFRARED IMAGES FOR MACHINE LEARNING USING BEAMSPLITTER-BASED CAMERA SYSTEM AND METHODS

(71) Applicant: Teledyne FLIR Commercial Systems, Inc., Goleta, CA (US)

(72) Inventors: Austin A. Richards, Goleta, CA (US); Andres Prieto-Moreno, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 17/246,303

(22) Filed: Apr. 30, 2021

(65) Prior Publication Data

US 2021/0342648 A1    Nov. 4, 2021

Related U.S. Application Data

(60) Provisional application No. 63/018,019, filed on Apr. 30, 2020.

(51) Int. Cl.
*G06V 10/143* (2022.01)
*G06T 7/37* (2017.01)
(Continued)

(52) U.S. Cl.
CPC ............ *G06V 10/143* (2022.01); *G06F 18/24* (2023.01); *G06T 7/37* (2017.01); *G06V 10/24* (2022.01); *G06V 10/774* (2022.01); *G06V 10/82* (2022.01); *H04N 23/62* (2023.01); *G06T 2207/10048* (2013.01); *G06T 2207/20081* (2013.01); *G06T 2207/20084* (2013.01)

(58) Field of Classification Search
CPC .................... G06K 9/6267; G06T 7/37; G06T 2207/10048; G06T 2207/20081; G06T 2207/20084; G06V 10/143; G06V 10/24; G06V 10/774; G06V 10/82; H04N 5/23216; H04N 5/23219; H04N 5/332
See application file for complete search history.

(56) References Cited

U.S. PATENT DOCUMENTS 7,483,213 B2    1/2009  Pochapsky
9,733,458 B2    8/2017  Georgiev et al.
(Continued)

FOREIGN PATENT DOCUMENTS

CN    110044486 A    7/2019
CN    110110629 A    8/2019

*Primary Examiner* — Tat C Chio
(74) *Attorney, Agent, or Firm* — Haynes and Boone, LLP

(57) ABSTRACT

Systems and methods include an infrared camera configured to capture an infrared image of a scene, a visible light camera configured to capture a visible light image of the scene, and a logic device configured to simultaneously capture a pair of images of the scene comprising the infrared image of the scene and the visible image of the scene, align the pair of images so that a pixel location in one of the pair of images has a corresponding pixel location in the other image, classify the visible image, annotate the infrared image based, at least in part, on the classification of the visible image, and add the annotated infrared image to a neural network training dataset for use in training a neural network for infrared image classification.

18 Claims, 9 Drawing Sheets

(51) Int. Cl.
*G06V 10/24* (2022.01)
*G06V 10/774* (2022.01)
*G06V 10/82* (2022.01)
*G06F 18/24* (2023.01)
*H04N 23/62* (2023.01)

(56) References Cited

U.S. PATENT DOCUMENTS

| | | | | |
|---|---|---|---|---|
| 10,520,742 | B1* | 12/2019 | Sulai | G06F 3/013 |
| 11,100,350 | B2* | 8/2021 | Piette | G06V 10/82 |
| 11,373,393 | B2* | 6/2022 | Redmon | G06V 10/449 |
| 2006/0261271 | A1 | 11/2006 | Lee | |
| 2008/0158679 | A1* | 7/2008 | Luty | G03B 15/006 |
| | | | | 359/555 |
| 2016/0316154 | A1 | 10/2016 | Elmfors et al. | |
| 2022/0036046 | A1* | 2/2022 | Yachida | G06V 10/50 |

\* cited by examiner

ANNOTATION OF INFRARED IMAGES FOR MACHINE LEARNING USING BEAMSPLITTER-BASED CAMERA SYSTEM AND METHODS

CROSS-REFERENCE TO RELATED APPLICATIONS

This application claims the benefit of and priority to U.S. Provisional Patent Application No. 63/018,019 filed Apr. 30, 2020 and entitled "ANNOTATION OF INFRARED IMAGES FOR MACHINE LEARNING USING BEAMSPLITTER-BASED CAMERA SYSTEM AND METHODS," which is incorporated herein by reference in its entirety.

TECHNICAL FIELD

One or more embodiments of the present disclosure relate generally to imaging systems, and more particularly, for example, to systems and methods for annotating infrared images for use with machine learning systems.

BACKGROUND

In the field of image processing, there is an ongoing need for efficient and reliable ways to analyze and process images captured by imaging devices. Conventional systems may include machine learning systems trained on labeled image datasets. However, training and validating these systems are subject to error when the images are difficult to accurately label. For example, thermal images present difficulties because human operators, even experts highly trained in the identification of objects in thermal images, can have trouble deciding how to label objects in a thermal scene. The difficulties arise because many objects can and do look quite different in the thermal IR bands than they do in the visible band. In view of the foregoing, there is a continued need in the art for improved image processing systems and methods.

SUMMARY

Various systems and methods are provided for annotating infrared images for use in machine learning applications. In some embodiments, a dual-band camera rig composed of a visible-light camera (e.g., producing an RGB image) and an infrared camera (e.g., a thermal IR camera) is used to acquire images that are spatially and temporally registered to a high degree of precision. The RGB images are annotated manually and/or automatically (e.g., by human technicians, automatic object recognition software, etc.). The annotations are then transferred to the infrared images, which themselves are much more difficult to annotate, since some edge details as well as color that gives context are not present in the thermal IR images.

The scope of the disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

The present disclosure provides systems and methods for annotating infrared images for use in machine learning applications. In some embodiments, a dual-band camera rig composed of a visible-light camera (e.g., producing an RGB image) and an infrared camera (e.g., a thermal IR camera) is used to acquire images that are spatially and temporally registered to a high degree of precision. The RGB images are annotated manually and/or automatically (e.g., by human technicians, automatic object recognition software, etc.). The annotations are then transferred to the infrared images, which themselves are much more difficult to annotate, since some edge details as well as color that gives context are not present in the thermal IR images.

In order to properly train a convolutional neural network (CNN) for image classification and evaluate the CNN's ability to classify images and the objects in them, the images are labeled with annotations that are used in the training set. In many applications, the annotation is a process where a human operator manually labels objects in an image, for example pedestrians or stop signs in a traffic scene. The CNN is trained with large datasets having thousands of images, for example. The CNN is evaluated based on the correctness of its ability to identify the annotated objects on new images from a test dataset that were not part of the training set.

There is some difficulty, however, in having human operators correctly annotate thermal IR images. For example, a two-year old human being can quite easily identify many objects with a single glance, but even experts highly trained in the identification of objects in thermal images can have trouble deciding how to label objects in a scene. The difficulties arise because many objects can and do look quite different in the thermal IR bands than they do in the visible band. For example, blue eyes do not look blue in a raw thermal image—the iris will be represented with shades of grey. Dark areas in a visible image can look quite bright in a thermal image and vice-versa, which adds to annotation confusion. In some cases, a thermal image can have an object with very high contrast between it and the scene, but very low contrast in the visible band.

Figure 1:
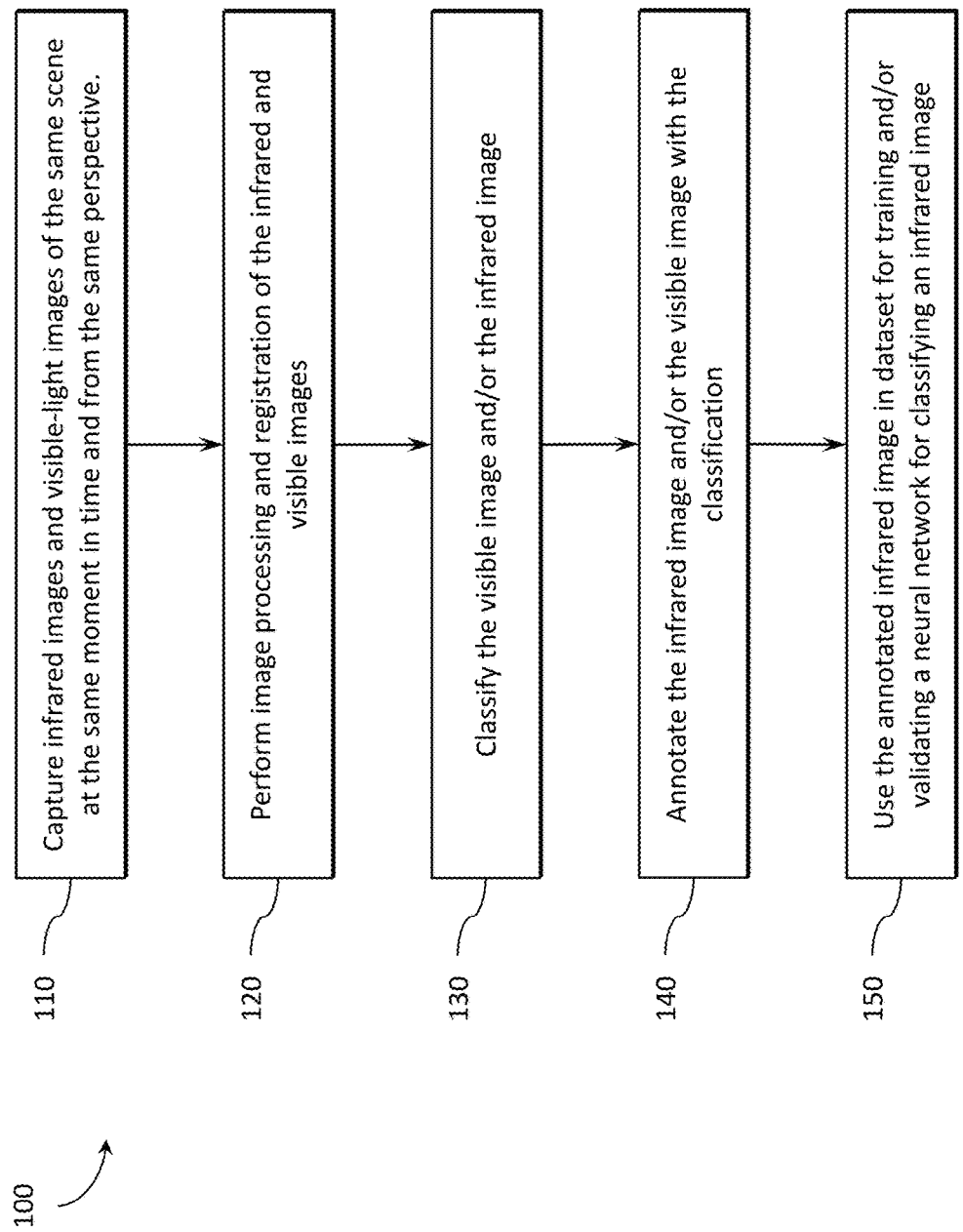
FIG. 1 is a flow chart of an example process for training a machine learning system for infrared image classification, in accordance with one or more embodiments of the present disclosure.

An example process for training a machine learning system for infrared image classification in accordance with one or more embodiments will now be described with reference to FIG. 1. In various embodiments, a process 100 includes, in step 110, capturing infrared images (e.g., thermal images) and visible-light images of the same scene at the same moment in time and from the same perspective. In step 120, the two images are registered so that a pixel on one image is registered to the corresponding pixel on the other image, and both pixels are viewing the same position in object space at the same moment in time. In various embodiments, a warping algorithm or other image alignment algorithm can be used.

In step 130, the visible image and/or infrared image are classified. In some embodiments, automatic object classifier application can be run on the visible image and/or thermal image to identify object classifications, object locations, and other object information from the images. In step 140, a human operator reviews the preliminary classifications and decides how to annotate them. In some embodiments, the annotations can be limited to one image, such as the visible image which is more likely to be visually understandable to the user than the infrared image, and then applied to the other image, such as the infrared image. The annotations may include an object location, an object classification and/or other object information.

In step 150, the annotated infrared image is used in a dataset to train and/or validate a machine learning system for classifying an infrared image. In some embodiments, a convolutional neural network (CNN) is trained for image classification and validated to evaluate the CNN's accuracy in classifying images and the objects in them, by using the annotated images to create a training dataset. The annotation process, as discussed above may be part of the CNN training process and may include manual classification where a human operator labels objects in the image by hand, for example pedestrians or stop signs. In some embodiments, human annotations may be assisted by running CNN detectors on the image that provide predictions (automatic or machine annotations) and, instead of starting from scratch, the annotator can then review the predictions and correct them if needed. The CNN is trained with large datasets consisting of thousands of images, and the CNN is evaluated based on the correctness of its ability to identify the annotated objects on new images from a validation dataset that were not part of the training set.

Figure 2A:
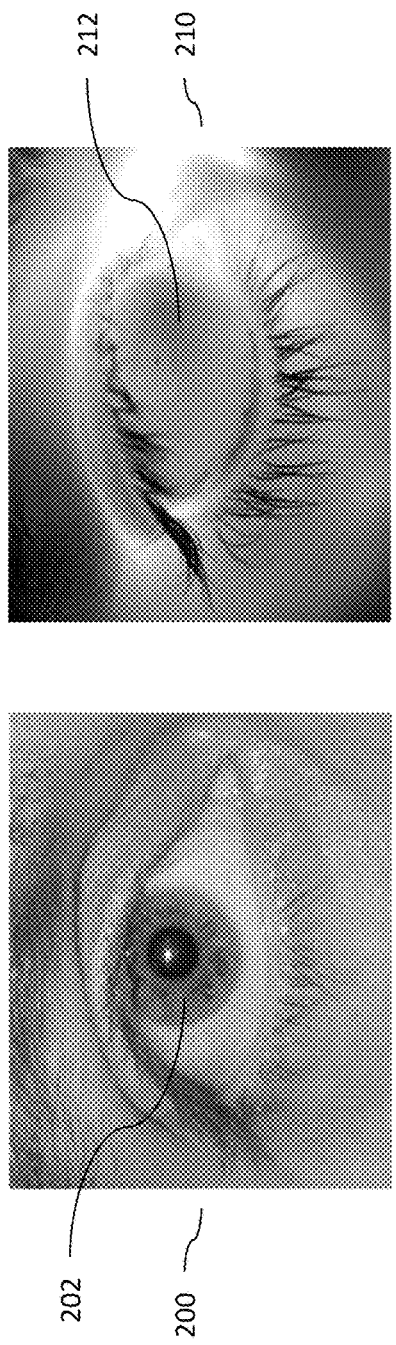
FIGS. 2A, 2B, 2C and 2D illustrate differences between visible and infrared images, in accordance with one or more embodiments of the present disclosure.
Figure 2B:
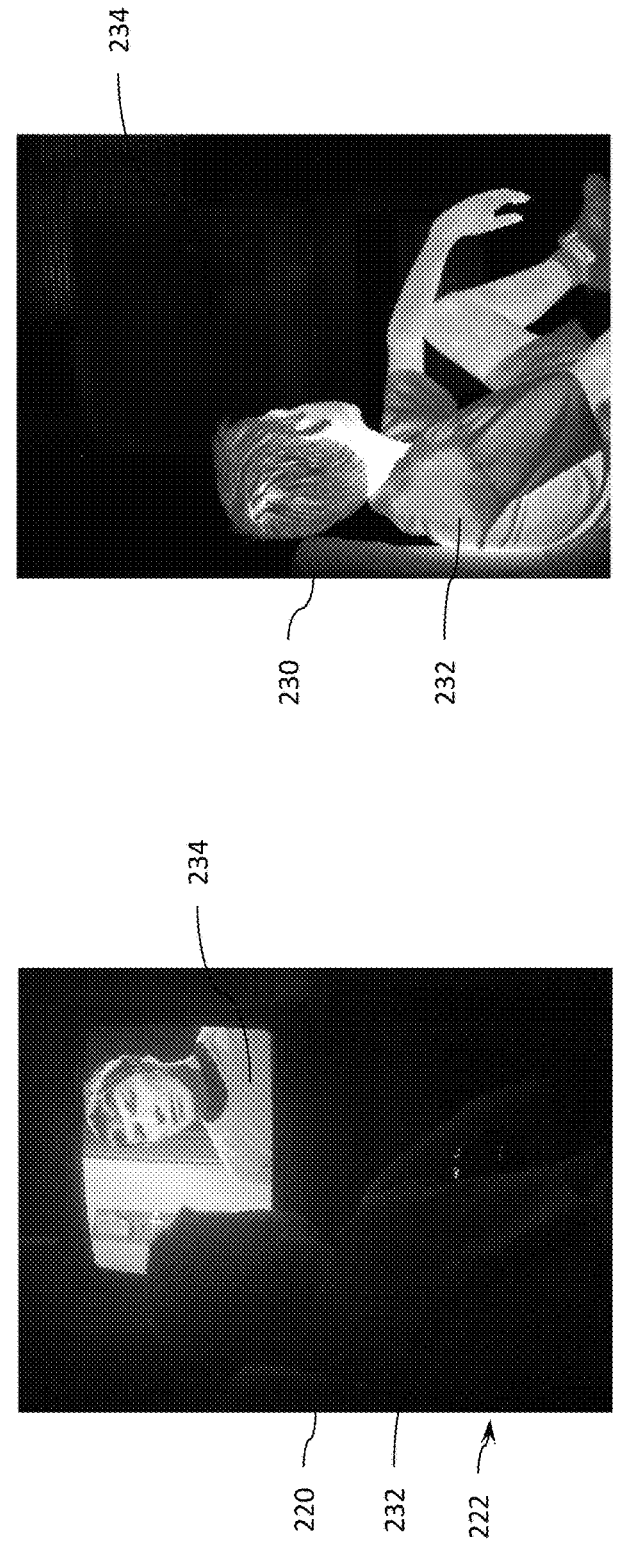
Figure 2C:
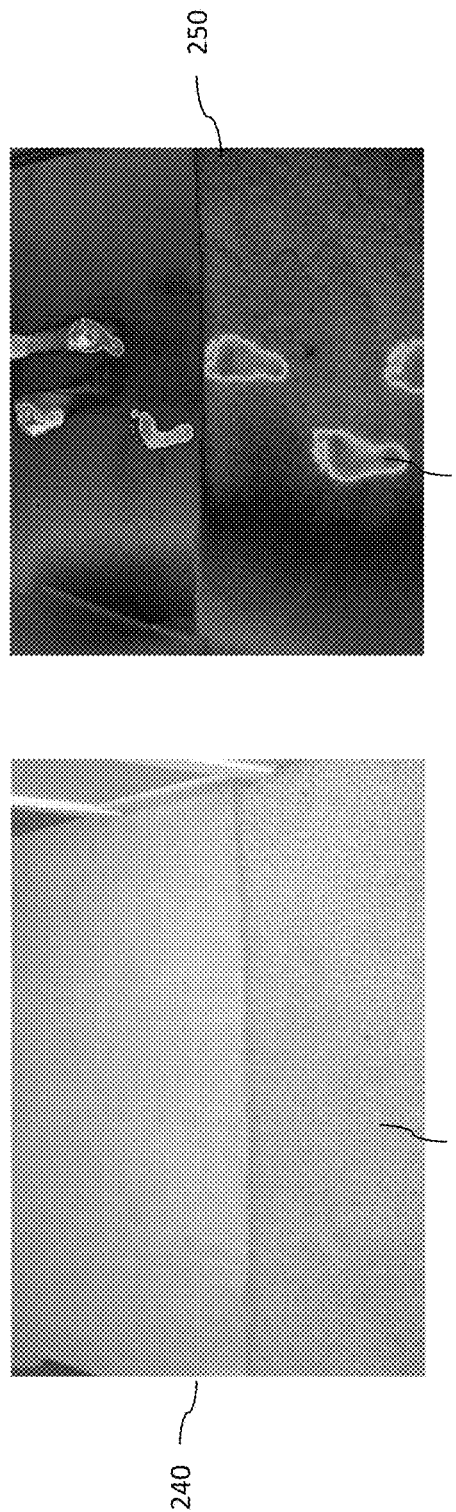

As previously discussed, there is some difficulty in having human operators correctly annotate thermal IR images. A two-year old human being can quite easily identify many objects with a single glance, but even experts highly trained in the identification of objects in thermal images can have trouble deciding how to label objects in a scene. The difficulties arise because many objects can and do look quite different in the thermal IR bands than they do in the visible band. For example, as illustrated in FIG. 2A, blue eyes 202 in a visible image 200 do not look blue in a raw thermal image 210—e.g., the iris may be represented with shades of grey 212 as illustrated. Referring to FIG. 2B, dark areas 222 in a visible image 220 can look quite bright in a thermal image 230 and vice-versa, which adds to annotation confusion. Here the TV 234 is barely discernable in the thermal image 230, just as the boy 232 is bright in the thermal image and barely apparent in the visible-light image. In some cases, a thermal image can have an object with very high contrast between it and the scene, but very low or no contrast in the visible band. Referring to FIG. 2C, for example, a visible image 240 and a midwave IR image 250 of hot footprints 252 illustrate this phenomenon. In this example, the footprints 252 are not visibly identifiable in the visible image 240 but can be seen in the midwave IR image 250.

In various embodiments disclosed herein, a solution is to train and teach the network for thermal image classification in the visible image and apply the annotation results to the thermal images in the training and validation datasets. In some embodiments, the solution includes both visible and thermal image classification, and the results are synthesized into the annotations as appropriate. The datasets include groups of images for training and validating the neural models. The quality of the datasets affects the resulting models, with more accurate datasets providing better quality models. The datasets may include multi-sensor datasets having images in two or more spectrums (e.g., visible, thermal, other spectrums).

When building datasets for multi-sensor training systems, image pairs are selected with accurate correspondence between the frames of the image pairs. As described herein, both spectrum frames may be taken at the same time from the substantially similar perspectives of the captured scene. Another factor that affects training performance is the accuracy of the box or polygon (e.g., the ground truth) that identifies the object to be analyzed.

In some embodiments, a beam splitter-based camera is employed to with two cameras that are in sync, so frames are captured at the same time. Using this camera reduces the time needed to select and register frames for use in a dataset. The system can select an appropriate data image from one of the spectrums (e.g., a high-quality image appropriate for a test image), and then the corresponding paired image will also be chosen for the dataset, thereby reducing time required to choose frames for the dataset.

After the accurate alignment of the two images (e.g., alignment of the pixels of each image), annotations may be performed on the image that best represents (or shows) the desired object and those annotations can be matched to the image in the other spectrum. This method improves the accuracy of the classification because each spectrum be used to identify the borders of the object.

In some embodiments, the multisensor camera may be combined in a system with a radiometric camera to provide additional functionally that would otherwise be difficult to implement with conventional systems. Pixel-to-pixel alignment allows the CNN models to work in both spectrums to provide the best of each. For example, in an elevated body temperature system, well illuminated objects will go through CNN-visible networks to identify shapes and body parts, then the CNN-thermal networks may be used to identify in these parts the skin and measure the temperature of it. In another example, the system could use visible light images to find the shape of an object (e.g., a car), and then use thermal images to locate and identify exhaust to determine whether a car is a electrical or gasoline powered vehicle.

In some embodiments, having the pixel-to-pixel alignment allows a direct temperature measurement of each pixel location that is captured in the visible spectrum. Visible light CNN models can be used for detection of objects and/or objects-parts and the corresponding pixels from the thermal image can provide the temperature information. This system has many advantages, including added privacy in systems in which the visible light image is used only to facilitate accurate temperature measurements, and is displayed or available for use to further identify a person.

Figure 2D:
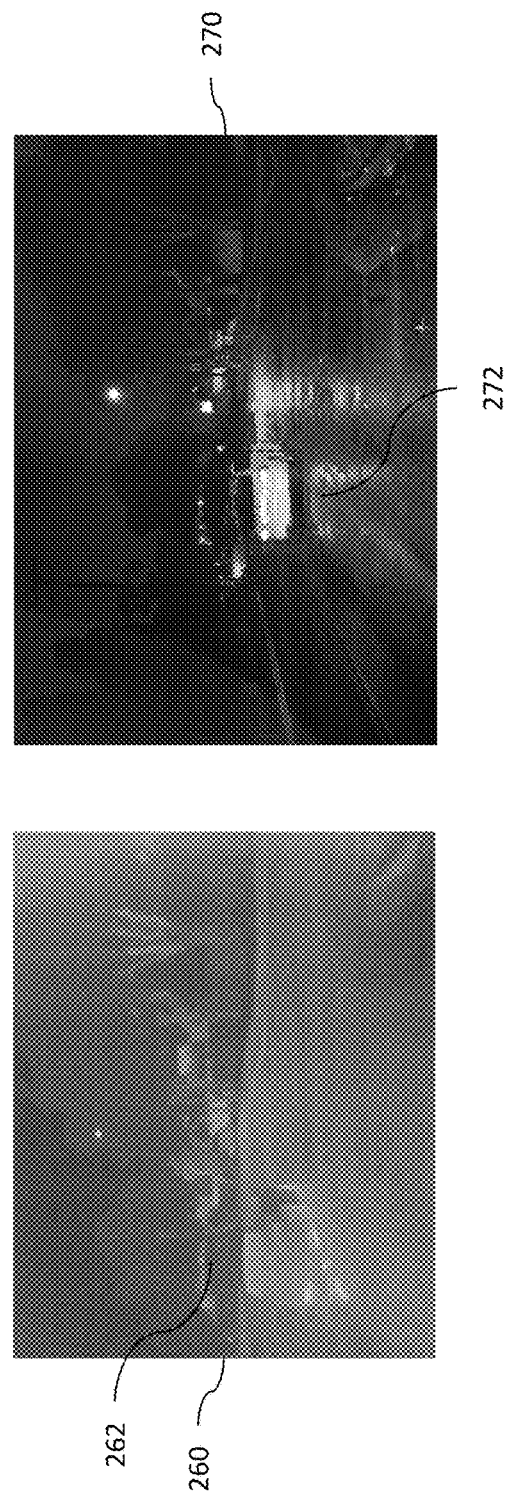

Referring to FIG. 2D, the visible image 270 on the right has been machine annotated, with blue bounding box 272 around a white car, but the car 262 is not annotated in the corresponding thermal image 260. A solution, as disclosed herein, is to capture thermal images and visible-light images of the same scene at the same moment in time and from the same perspective. A warping algorithm or other alignment algorithm can be used to register the two images so that a pixel on one channel is registered to the corresponding pixel on the other channel, and both these pixels are viewing the same position in object space at the same moment in time. A human annotator can compare both images (and automatic image classification results, if available) and decide how to annotate them both. The annotations for one image can then be applied to the other image. This concept can be used to improve the auto-classification of thermal images using convolutional neural networks which have been trained with visible images. The visible-light image of the pair will be used for this matter, and results will be applicable to the corresponding thermal image.

Another advantage of the present embodiment is that classification can be performed with increased levels of privacy, because a third party can classify the images using visible image data without sharing the private infrared data. The results can then be applied to the thermal IR images. For the scenes that only reveal context in thermal IR, a second phase may be applied that includes automated thermal image classification and/or human classification, but in general this technique will reduce the effort a lot.

Figure 3:
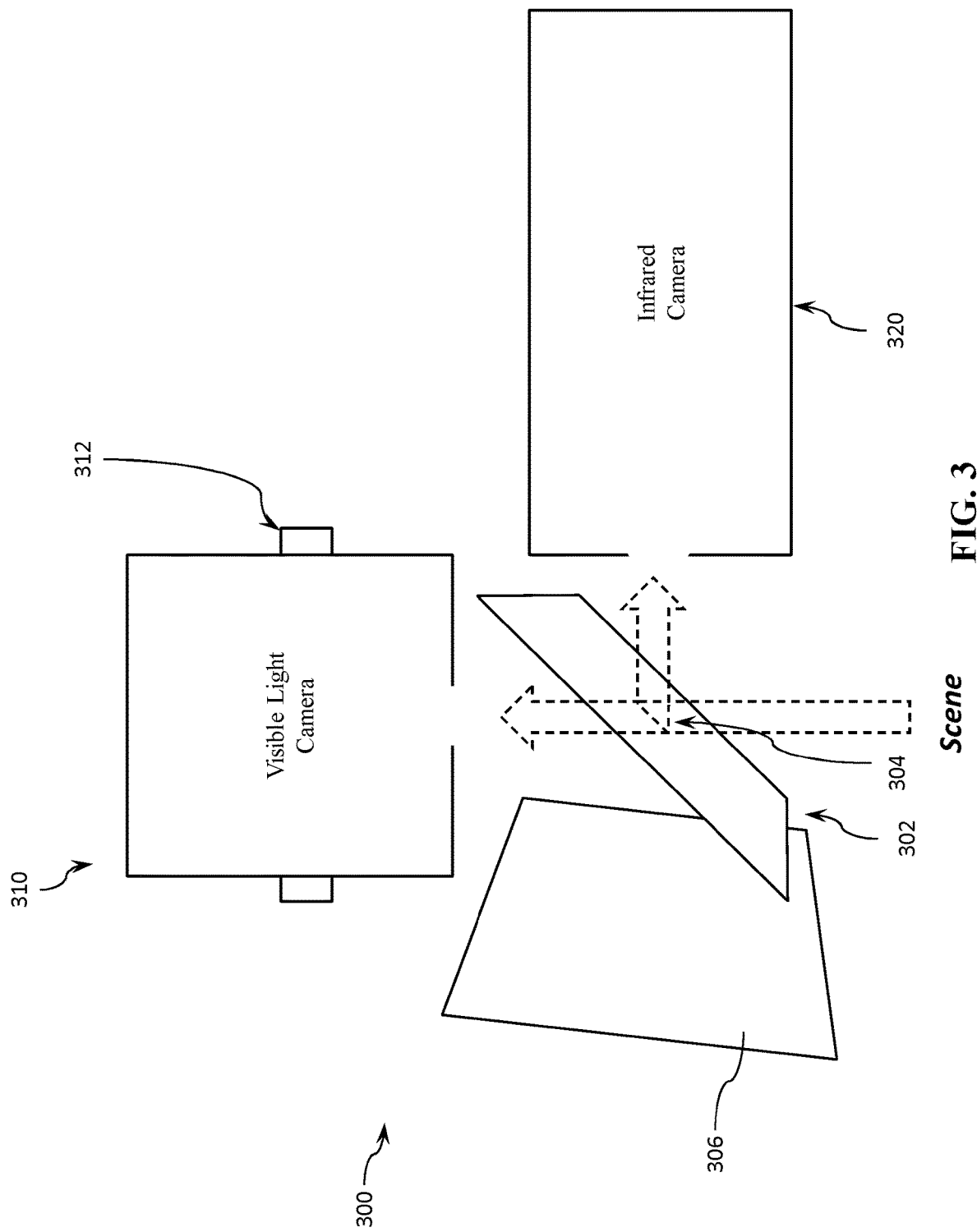
FIG. 3 illustrates a system for generating paired visible light and infrared dataset images, in accordance with one or more embodiments of the present disclosure.
Figure 4B:
FIGS. 4A, 4B, 4C, 4D and 4E are example visible and infrared image pairs captured using the system of FIG. 3, in accordance with one or more embodiments of the present disclosure.
Figure 4D:
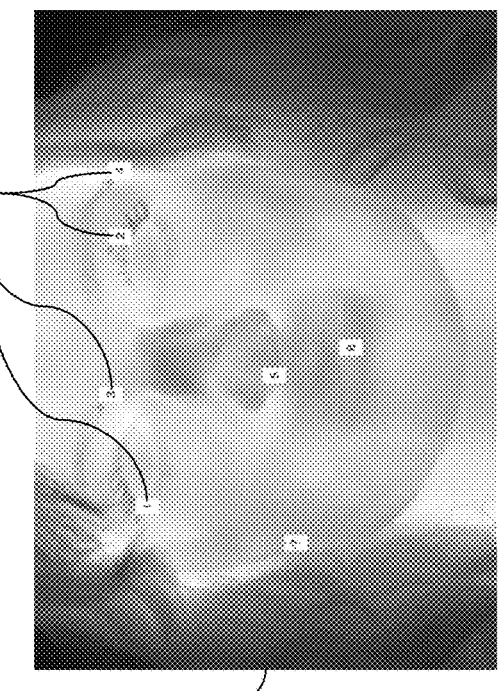
Figure 4A:
Figure 4C:
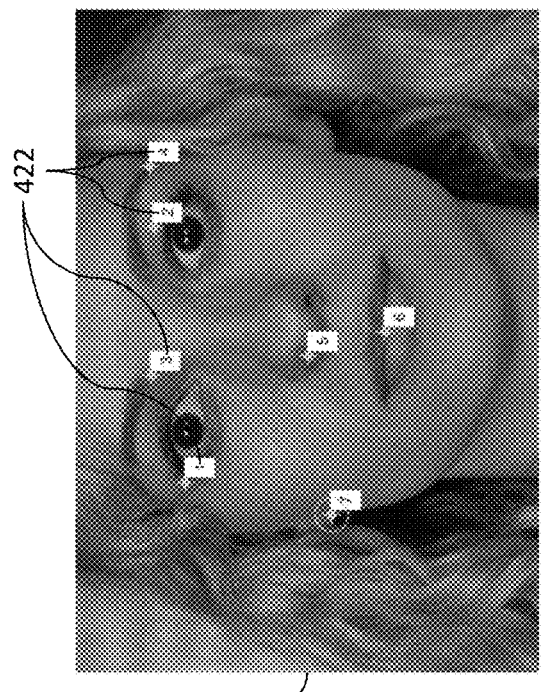
Figure 4E:

Embodiments of a system for generating dataset images in accordance with the present disclosure are illustrated in FIG. 3. The time synchronization can be accomplished by making one of the cameras trigger the other. An infrared camera 320 (e.g., a high definition midwave infrared camera) is configured with synchronous outputs that can be routed into the sync input of a visible light camera 310. The two cameras are configured to start integration of a scene at the same time (e.g., within a few microseconds), with matched integration times which matches motion blur between the two channels.

Spatial registration can be accomplished with a system 300 that further includes a dichroic beamsplitter 302 which separates visible and infrared radiation from the scene. The visible light camera 310 and the infrared camera 320 are positioned to receive the separated visible and infrared radiation, respectively. In the illustrated embodiment, the infrared camera 320 is a midwave IR camera that captures a reflection 304 of the scene folded through 90 degrees of angle by the beamsplitter 302 which is viewed by the infrared camera 320 at a 45-degree angle. The visible light camera 310 looks through the beamsplitter 302 at the scene, which may include an object to detect and classify. In various embodiments, it is desirable for the optical axes of the visible light camera 310 and the infrared camera 320 to be precisely lined up so that there is negligible perspective change between the two, which allows for the creation of accurately registered images at all distances.

If the two cameras are mounted next to each other, there will be a parallax error between them. The illustrated system 300 eliminates all parallax. The lenses for the two cameras may be selected to match the fields of view between the cameras, and/or adjustments to the captured images (e.g., cropping the larger image) may be performed after image capture. In some embodiments, the cameras are mounted on bore sighting mounts 312 that can be adjusted in elevation and azimuth angles. Precision spacers underneath the visible light camera mount sets the height of the visible-light optical axis above the optical breadboard to be the same as the midwave IR optical axis. A glare stop 306, such as a piece of dark grey foam, is located to the left of the beamsplitter 302 in the illustrated embodiment to reduce reflections of visible light off the beamsplitter side facing the visible light camera 310.

As illustrated, the beamsplitter 302 may be implemented as a dichroic beamsplitter made of 0.3" BK7 glass. One side of the glass is coated with a layer of indium tin oxide (ITO) which makes it ~80% reflective in the midwave IR band (3-5 microns in wavelength units). The beamsplitter 302 is also ~90% transparent to visible light. In various embodiments, the beamsplitter 302 may be any beamsplitter that reflects a desired infrared band and is transparent to visible light to allow for image capture at a quality that satisfies requirements of a particular system implementation.

Referring to FIGS. 4A-F, a pair of images taken with an example system are shown. The two images (such as visible image 400 and infrared image 410) can be spatially registered with high precision with various techniques, including a two-dimensional affine transform which can be defined by control points (such as control points 422 shown in visible image 420 and infrared image 430) that are common to the two images. The affine transform warps the image to correct for differences in the lens distortions and results in precise image registration across the entire field of view. In one approach, the visible image 400 is warped to match the infrared image 410. The control points 422 may be selected in places with high contrast in both images, as shown in visible image 420 and infrared image 430. The resulting overlay image 440 of the two images is shown with a color "map" with the "fixed" midwave IR image shown in green and the moving image shown in purple.

In some embodiments, a registration process can include use of a target that has high-contrast fiducial points distributed over the entire field of view. This can be achieved with an ambient temperature white panel perforated with small holes and backlit with a black-painted heated panel. The affine transform can be determined and used on subsequent images shot with the system, as long as the cameras and beamsplitter assembly all remain locked into the same relative positions.

Figure 5:
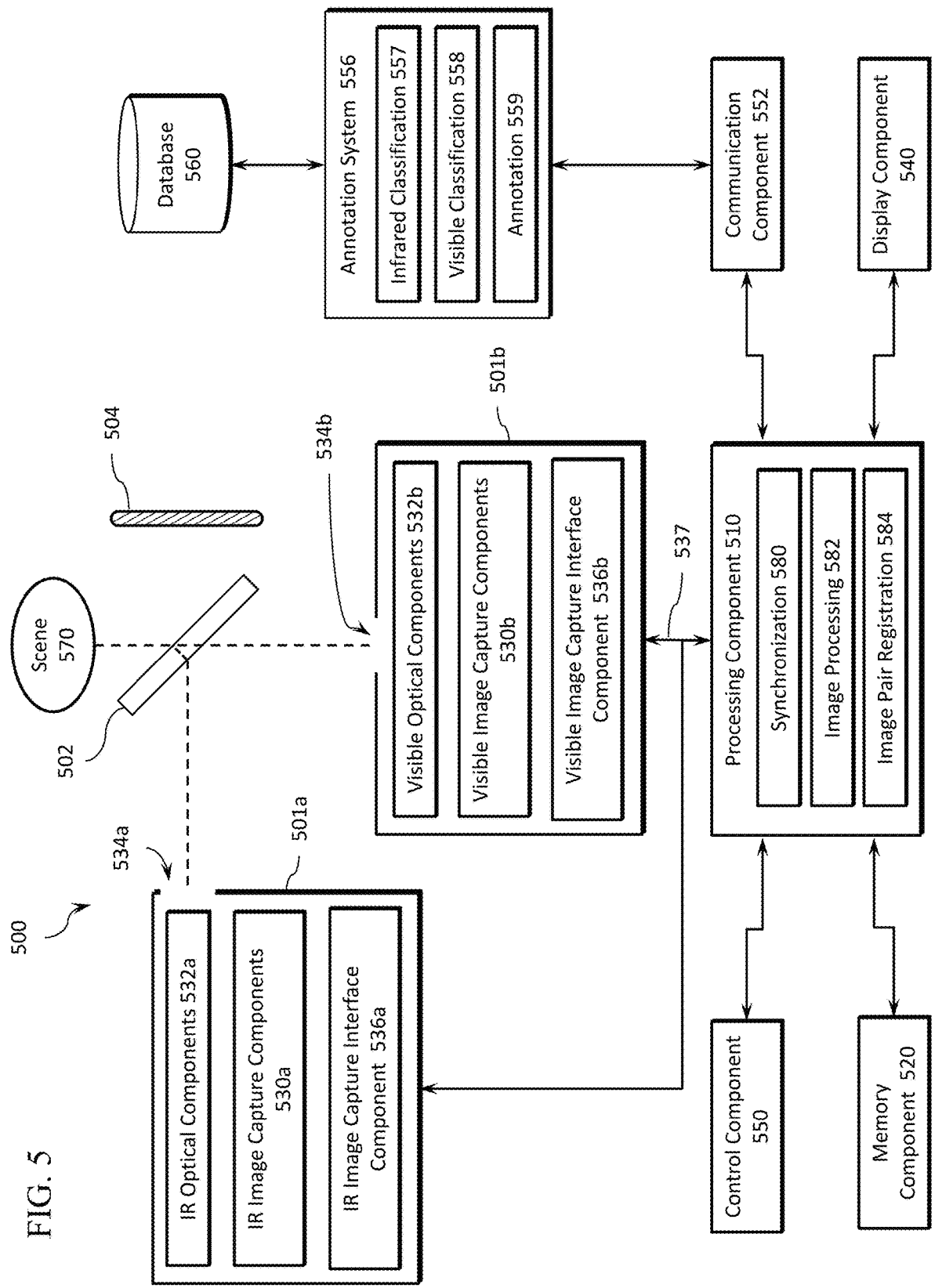
FIG. 5 illustrates an example infrared imaging and annotation system, in accordance with one or more embodiments of the present disclosure.

Referring to FIG. 5, an example image capture system 500 that may be used to generate annotated infrared images as described herein will now be described, in accordance with one or more embodiments. In the illustrated embodiment, the image capture system is configured to capture and process both visible and infrared images, align the pair of captured images, and annotate the infrared image and/or visible image for use in training an image classifier for a variety of uses. In some embodiments, the image capture system 500 is configured to operate as described with respect to the embodiment of FIG. 3.

The image capture system 500 may be used for imaging a scene 570 in a field of view. The image capture system 500 includes a processing component 510, a memory component 520, an infrared camera 501a, a visible light camera 501b, an optional display component 540, a control component 550, a communication component 552, and other components depending on the system implementation. The infrared camera 501a includes IR image optical components 532a (e.g., one or more lenses configured to receive radiation through an aperture 534a in infrared camera 501a and pass the radiation to IR image capture component 530a), IR image capture components 530a, and an IR image capture interface component 536a.

IR image capture components 530a include, in one embodiment, one or more sensors for capturing infrared image signals representative of an image, of scene 570. The sensors of image capture components 530a provide for representing (e.g., converting) a captured infrared image signal of scene 570 as digital data (e.g., via an analog-to-digital converter included as part of the sensor or separate from the sensor as part of image capture system 500). In some embodiments, the image capture components 530a include infrared sensors (e.g., infrared detectors) implemented in an array or other fashion on a substrate. For example, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired. Infrared sensors may be implemented, for example, as microbolometers or other types of thermal imaging infrared sensors arranged in any desired array pattern to provide a plurality of pixels.

The visible light camera 501b includes visible image optical components 532b (e.g., one or more lenses configured to receive visible spectrum radiation through an aperture 534b in camera 501b and pass the received visible spectrum to visible image capture component 530b), visible image capture components 530b, and a visible image capture interface component 536b. Visible image capture components 530b include, in one embodiment, one or more sensors for capturing visible light image signals representative of an image of scene 570. The sensors of visible image capture components 530b provide for representing (e.g., converting) a captured visible light image signal of scene 570 as digital data (e.g., via an analog-to-digital converter included as part of the sensor or separate from the sensor as part of image capture system 500). In some embodiments, the visible image capture components 530b include light sensors implemented in an array or other fashion on a substrate. For example, sensors may be implemented as a charge-coupled-device (CCD) sensor, scientific complementary metal oxide semiconductor (sCMOS) sensor, or other visible light sensor.

In various embodiments, image capture system 500 may be implemented as a paired imaging system to simultaneously capture image frames of the scene 570 using IR camera 501a and visible light camera 501b. In various embodiments, the cameras 501a and 501b may represent any type of camera system that is adapted to image the scene 570 and provide associated image data as described herein. The image capture system 500 may be implemented at various types of fixed locations and environments, or in a portable device or vehicle. The system includes a beamsplitter 502 which separates visible and infrared radiation from the scene 570. The visible light camera 501b and the infrared camera 501a are positioned to receive the separated visible and infrared radiation, respectively. The infrared camera 501a (e.g., a midwave IR camera) is mounted to capture a reflection of the scene folded through a 90-degree angle by the beamsplitter 502 which is viewed by the infrared camera 501a at a 45-degree angle. The visible light camera 501b is mounted to capture a visible light image of the scene 50 through the beamsplitter 502. In various embodiments, it is desirable for the optical axes of the visible light camera 501b and the infrared camera 501a to be precisely lined up so that there is negligible perspective change between the two captured images, which allows for the creation of accurately registered images at various distances.

The optical components 532a and 532b for the two cameras may be selected to match the fields of view between the cameras, and/or adjustments to the captured images (e.g., cropping the larger image) may be performed after image capture. In some embodiments, the cameras are mounted on a board and can be adjusted in elevation and azimuth angles. Precision spacers underneath the mounts or other mounting components may be used to set the height of the optical axes to the same heights. A glare stop 504, such as a piece of dark grey foam, is positioned adjacent to the beamsplitter 502 to reduce reflections of visible light off the side of the beamsplitter 502 facing the visible light camera 501b.

The beamsplitter 502 may be implemented as a dichroic beamsplitter made of 0.3" BK7 glass, with one side of the glass coated with a layer of indium tin oxide (ITO) which makes it ~80% reflective in the midwave IR band (3-5 microns in wavelength units). In this embodiment, the beamsplitter 502 may be ~90% transparent to visible light. In various embodiments, the beamsplitter 502 may be any beamsplitter that reflects a desired infrared band and is transparent to visible light to allow for high quality image capture.

Processing component 510 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), a graphics processing unit and/or any other appropriate combination of processing device and/or memory to execute instructions to perform any of the various operations described herein. Processing component 510 is adapted to interface and communicate with components 536a, 536b, 520, 530, 540, and 550 to perform methods and processing steps as described herein. Processing component 510 may also be adapted to perform synchronization 580 of the cameras 501a and 501b to capture images of the scene 570 at approximately the same time and with approximately the same integration period, image processing through image processing component 582, and/or image pair registration (image pair registration component 584) as described herein.

It should be appreciated that processing operations and/or instructions may be integrated in software and/or hardware as part of processing component 510, or code (e.g., software or configuration data) which may be stored in memory component 520. Embodiments of processing operations and/or instructions disclosed herein may be stored by a machine-readable medium in a non-transitory manner (e.g., a memory, a hard drive, a compact disk, a digital video disk, or a flash memory) to be executed by one or more computers (e.g., logic or processor-based system) to perform various methods disclosed herein.

Memory component 520 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 510 is adapted to execute software stored in memory component 520 and/or a machine-readable medium to perform various methods, processes, and operations in a manner as described herein.

Processing component 510 may be adapted to receive image signals from image capture components 530a and 530b, process image signals (e.g., to provide processed image data), store image signals or image data in memory component 520, and/or retrieve stored image signals from memory component 520. In various aspects, processing component 510 may be remotely positioned, and processing component 510 may be adapted to remotely receive image signals from image capture components 530 via wired or wireless communication with image capture interface component 536, as described herein.

Display component 540 may include an image display device (e.g., a liquid crystal display (LCD)) or various other types of generally known video displays or monitors. Control component 550 may include, in various embodiments, a user input and/or interface device, such as a keyboard, a control panel unit, a graphical user interface, or other user input/output. Control component 550 may be adapted to be integrated as part of display component 540 to operate as both a user input device and a display device, such as, for example, a touch screen device adapted to receive input signals from a user touching different parts of the display screen.

Processing component 510 may be adapted to communicate with image capture interface components 536a and 536b (e.g., by receiving data and information from image capture components 530a and 530b). Image capture interface components 536a and 536b may be configured to receive image signals (e.g., image frames) from image capture components 530a and 530b, respectively, and communicate image signals to processing component 510 directly or through one or more wired or wireless communication components (e.g., represented by connection 537) in the manner of communication component 552.

In one or more embodiments, communication component 552 may be implemented as a network interface component adapted for communication with a network and may include one or more wired or wireless communication components. In various embodiments, a network may be implemented as a single network or a combination of multiple networks, and may include a wired or wireless network, including a wireless local area network, a wide area network, the Internet, a cloud network service, and/or other appropriate types of communication networks. The image capture system 500 may be configured to operate with one or more computing devices, servers and/or one or more databases, and may be combined with other components. In some embodiments, image capture system 500 may send image pairs over a network (e.g., the Internet or the cloud) to a server system, for remote image pair registrations and processing, annotations, and other processes as disclosed herein.

Registered image pairs may be provided to an annotation system 556 for further processing. In various embodiments, the annotation system 556 may be integrated into a local computing system with one or more other components of image capture system 500, accessed through a wireless or wired communications link, accessed through a network, such as the Internet or a cloud service, a standalone system (e.g., receiving registered image pairs via an external memory device), a mobile system, or other system configured to perform the systems and methods described herein. In various embodiments, the annotation system 556 includes infrared classification components 557 for automatically (e.g., using a trained CNN) and/or manually (e.g., user interface) analyzing infrared images and visible classification components 558 for automatically and/or manually analyzing visible images. The image classification may include, for example, detecting one or more objects in an image, defining a bounding box around detected objects, and/or classifying detected objects. The annotation components 559 are configured to provide an interface that synthesizes the infrared and visible classification information for an image pair allowing a user to view the images and proposed annotations and confirm and/or edit the annotations. The annotated image pairs may then be stored in a database 560 for use in training and/or validating a neural network for infrared image classification.

Various aspects of the present disclosure may be implemented for training neural networks and/or other machine learning processes to analyze and/or classify captured infrared images for a variety of applications, including surveillance, traffic monitoring, detection and tracking of people, fever monitoring, etc. Embodiments of neural networking training systems and methods that may be used in the present disclosure will now be described with reference to FIGS. 6A-D.

Figures 6A, 6B:
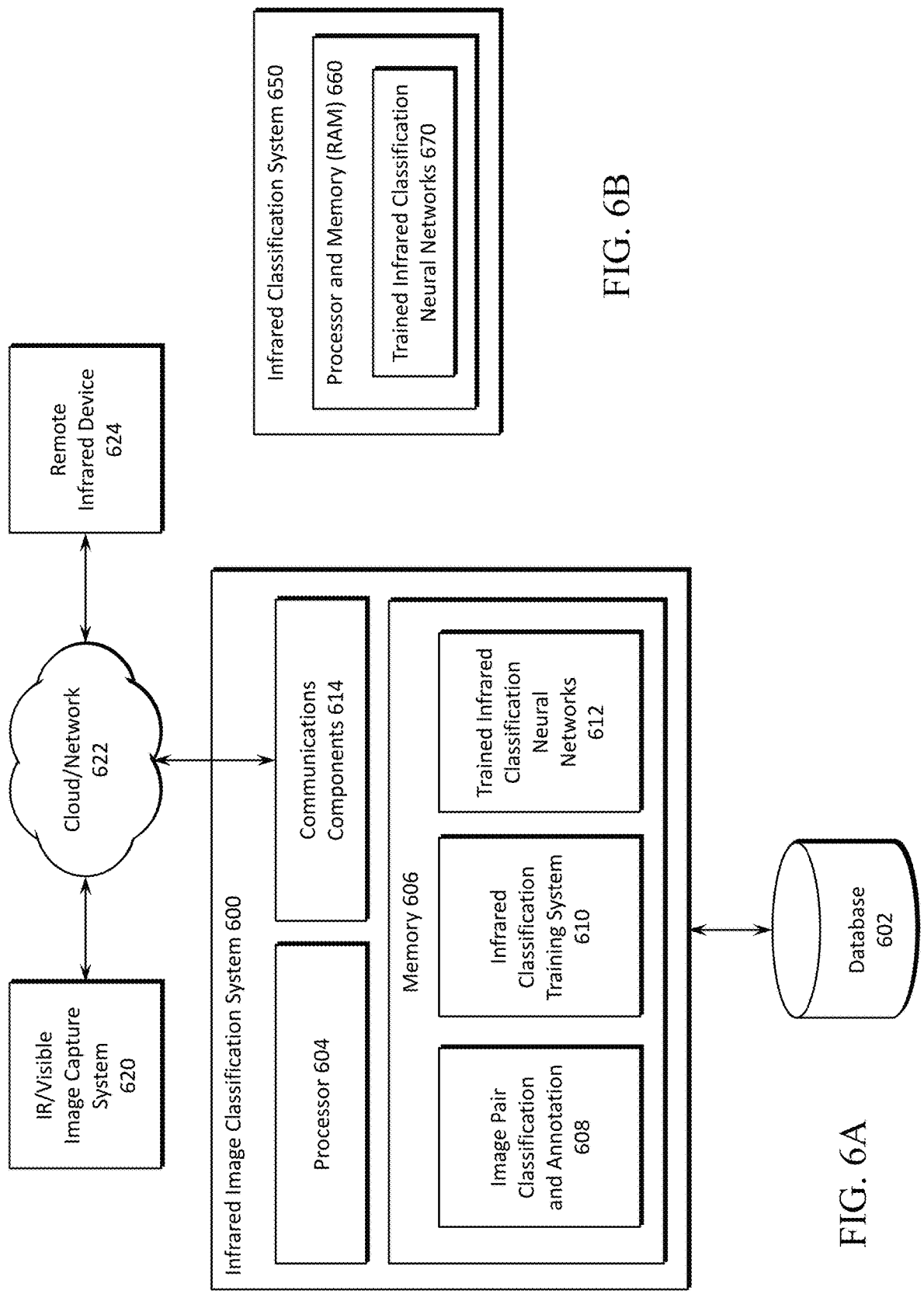
FIG. 6A illustrates an infrared classification training system, in accordance with one or more embodiments.
FIG. 6B illustrates an infrared classification system, in accordance with one or more embodiments.

Referring to FIG. 6A, embodiments of an infrared classification system will be described. The infrared classification system 600 may be implemented as a standalone system and/or on one or more servers such as an application server that performs data processing and/or other software execution operations for training, storing, and neural networks used by the infrared classification system 600. In some embodiments, the components of the infrared classification system 600 may be distributed across a communications network, such as cloud/network 622. The communications network 622 may include one or more local networks such as a wireless local area network (WLAN), wide area networks such as the Internet or cloud network, and other wired or wireless communications paths suitable for facilitating communications between components as described herein. The infrared classification system 600 includes communications components 614 operable to facilitate communications with one or more remote systems, such as a remote infrared device 624 configured to capture one or more infrared images of a scene and detect and/or classify objects therein, and an infrared/visible image capture system 620 configured to capture registered infrared/visible image pairs for use in training an infrared image classification system.

In various embodiments, the infrared classification system 600 may operate as a networked infrared image classification system, such as a cloud-based system, or may be configured to operate in a dedicated system, such as a surveillance system that processes thermal images and other data captured in real time from one or more surveillance devices (e.g., a thermal imaging camera as described herein). The infrared classification system 600 may be configured to analyze the captured data and return information relating to an infrared image classification, such as location of detection objects, classification of detected objects, confidence measure for the classification, etc. The infrared classification system 600 may also include a database 602 for storing captured infrared/visible image pairs, training datasets, trained neural networks, and other information.

As illustrated, the infrared classification system 600 includes one or more processors 604 that perform data processing and/or other software execution operations. The processor 604 may include logic devices, microcontrollers, processors, application specific integrated circuits (ASICs), field programmable gate arrays (FPGAs) or other devices that may be used by the infrared image classification system 600 to execute appropriate instructions, such as software instructions stored in memory 606 including image pair classification and annotation components 608, infrared classification training system components 610, trained infrared classification neural networks 612 (e.g., a convolutional neural network trained by a training dataset stored in the database 602), and/or other applications.

The memory 606 may be implemented in one or more memory devices (e.g., memory components) that store executable instructions, data and information, including image data, video data, audio data, network information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein.

The remote infrared device 624 may be implemented as a computing device such as a thermal imaging camera, a handheld temperature sensing device, a desktop computer or network server, a mobile computing device such as a mobile phone, tablet, laptop computer or other computing device having communications circuitry (e.g., wireless communications circuitry or wired communications circuitry) for connecting with other devices. In some embodiments, the remote infrared device 624 may include one or more unmanned vehicles (e.g., drones) such as an unmanned aerial vehicle, an unmanned ground vehicle, or other unmanned vehicle.

The communications components 614 may include circuitry for communicating with other devices using various communications protocols. In various embodiments, communications components 614 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 614 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 614.

One or more trained infrared classification systems may be implemented in a remote, real-time environment, as illustrated in FIG. 6B. The infrared classification system 650 may include a thermal imaging camera or other device or system operable to receive and/or generate thermal images and process the received thermal images for input to a trained infrared classification neural network 670. The infrared classification system 650 includes a processor and memory 660, operable to store one or more trained neural networks and implement the neural network run-time interface (such as trained infrared classification neural network 670) thereon.

Figure 6C:
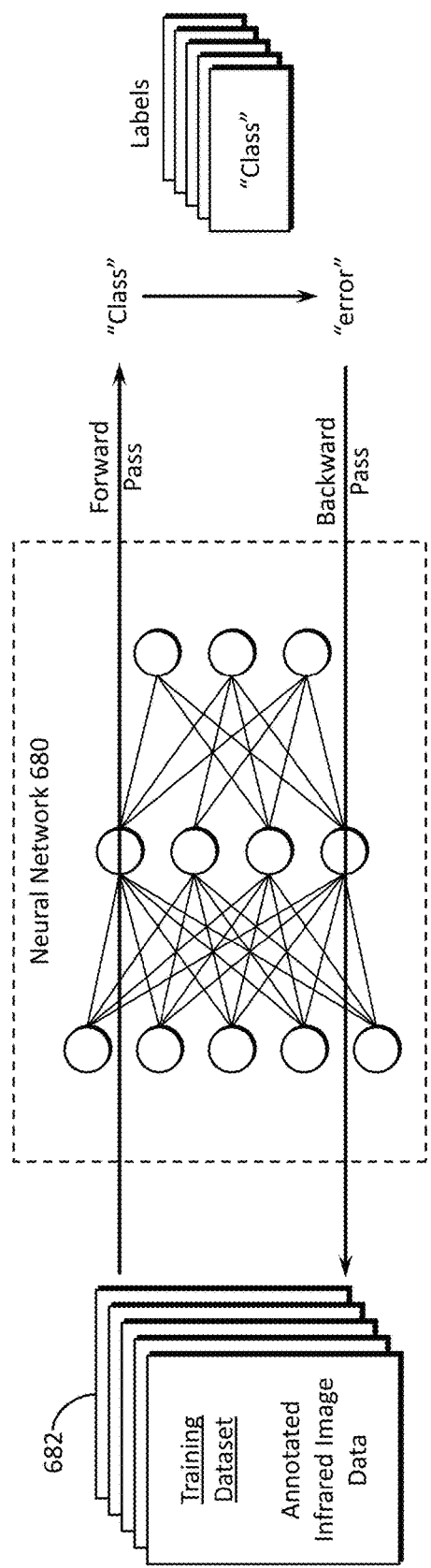
FIGS. 6C and 6D illustrate neural network training and validation processes, in accordance with one or more embodiments.

In various embodiments, a training dataset stored in the database 602 may be created from annotated registered image pairs and used to train one or more neural networks and other machine learning algorithms for use in an infrared classification system. Referring to FIG. 6C, an embodiment of a neural network training process will now be described. In one embodiment, the neural network 680 is a convolutional neural network (CNN) that receives the training dataset 682 and outputs a classification for the data. The present disclosure describes a plurality of neural networks that may be trained for one or more infrared image determinations, including but not limited to, detecting and tracking objects and/or people from thermal images, detection of a temperature measurement location in a thermal image, classification of a detected object, and/or determination of whether an individual has a fever.

The training dataset includes annotated infrared image data created from registered visual and infrared pairs as described herein. The data may also include annotated infrared data created through other means, including synthetic data generated to simulate real-world images. In one embodiment, the training starts with a forward pass through the neural network 680 including feature extraction, a plurality of convolution layers and pooling layers, a plurality of fully connected layers, and an output layer that includes the desired classification. Next, a backward pass through the neural network 680 may be used to update the CNN parameters in view of errors produced in the forward pass (e.g., misclassified data). In various embodiments, other processes may be used in accordance with the present disclosure.

Figure 6D:
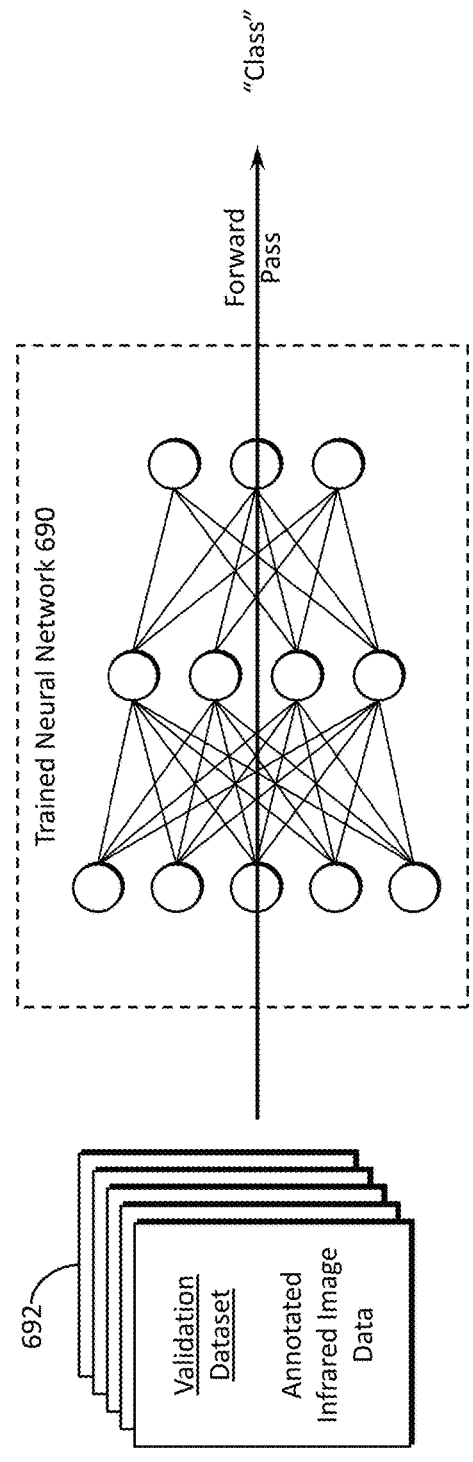

An embodiment for validating the trained neural network is illustrated in FIG. 6D. A set of fully annotated validation test data 692 is fed into the trained neural network 690. The validation test data 692 may include annotated infrared data generated from registered infrared/visible image pairs as described herein, that was not used as part of the training dataset 682. Detected errors (e.g., image misclassification) may be analyzed and fed back to the training system to update the training model, which in turn updates the training dataset 682 to create a more accurate classification model. In various embodiments, detected errors may be corrected by adding more examples of the data (e.g., more types of environments), increasing the resolution of the data and/or increasing the accuracy of the thermal modeling, to help distinguish between data types. By adjusting the training dataset to improve accuracy on-the-fly, the operator can avoid costly delays in implementing accurate classification systems.

In various embodiments, the system is configured to save data generated in real-time in the field for analysis and training of one or more neural networks. For example, data from a deployed system may be fed back into a CNN training process to refine the CNN to improve classification for a particular environment (e.g., detect temperature of people in an airport), desired classification goal (e.g., train the CNN to detect and track one or more objects) and/or for more accurate performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
simultaneously capturing a pair of images of a scene comprising an infrared image of the scene and a visible image of the scene, wherein the pair of images is captured from substantially a same perspective through separate optical paths of a beamsplitter;
aligning the pair of images so that a pixel location in one of the pair of images has a corresponding pixel location in the other image, and both corresponding pixels represent the same position in the scene;
classifying the visible image, including an identification of one or more objects in the visible image;
classifying the infrared image, including an identification of one or more objects present in the infrared image;
annotating the infrared image based, at least in part, on the classification of the visible image and the classification of the infrared image; and
adding the annotated infrared image to a neural network training dataset for use in training a neural network for infrared image classification.

2. The method of claim 1, wherein simultaneously capturing the pair of images of the scene further comprises capturing the infrared image using an infrared camera and capturing the visible image using a visible light camera.

3. The method of claim 1, wherein simultaneously capturing the pair of images of the scene further comprises capturing the pair of images of the scene through the beamsplitter which is arranged to reflect a first image of the scene towards a first camera and pass through a second image of the scene to a second camera.

4. The method of claim 1, wherein aligning the pair of images so that the pixel location in one of the pair of images has a corresponding pixel location in the other image further comprises determining a transformation between the pair of images so that the pixel location in each image represents a same location in the scene; and applying the transformation to the image pair to align the images.

5. The method of claim 1, wherein classifying the visible image comprises receiving an image classification from a user and/or automatically generating a visible image classification using a trained neural network.

6. The method of claim 1, further comprising classifying the infrared image by receiving an infrared image classification from a user and/or automatically generating an infrared image classification using a trained neural network.

7. The method of claim 1, wherein the infrared image is annotated based, at least in part, on a classification of the infrared image.

8. The method of claim 1, wherein annotating the infrared image comprises:
presenting a user interface displaying the visible image, the infrared image and corresponding annotations; and
receiving user input modifying one or more annotation.

9. The method of claim 1, wherein annotating the infrared image comprises applying visible image classification information to the infrared image.

10. The method of claim 1, further comprising training a neural network to classify an infrared image using the neural network training dataset including the annotated infrared image.

11. A system comprising:
an infrared camera configured to capture an infrared image of a scene;
a visible light camera configured to capture a visible light image of the scene;
a beamsplitter arranged to reflect a first image of the scene towards the infrared camera and pass through a second image of the scene to the visible light camera; and
a logic device configured to:
simultaneously capture a pair of images of the scene comprising the infrared image of the scene and the visible image of the scene, wherein the pair of images is captured from substantially a same perspective through separate optical paths of the beamsplitter;
align the pair of images so that a pixel location in one of the pair of images has a corresponding pixel location in the other image, and both corresponding pixels represent the same position in the scene;
classify the visible image, including an identification of one or more objects in the visible image;
classify the infrared image, including an identification of one or more objects in the infrared image;
annotate the infrared image based, at least in part, on the classification of the visible image and the classification of the infrared image; and
add the annotated infrared image to a neural network training dataset for use in training a neural network for infrared image classification.

12. The system of claim 11, wherein the logic device is configured to align the pair of images wherein the pixel location in one of the pair of images has a corresponding pixel location in the other image further by determining a transformation between the pair of images so that the pixel location in each image represents a same location in the scene; and applying the transformation to the image pair to align the images.

13. The system of claim 11, wherein the logic device is configured to classify the visible image by receiving an image classification from a user and/or automatically generating a visible image classification using a trained neural network.

14. The system of claim 11, wherein the logic device is further configured to classify the infrared image by receiving an infrared image classification from a user and/or automatically generating an infrared image classification using a trained neural network.

15. The system of claim 11, wherein the logic device is further configured to annotate the infrared image based, at least in part, on a classification of the infrared image.

16. The system of claim 11, wherein the logic device is further configured to annotate the infrared image by presenting a user interface displaying the visible image, the infrared image and corresponding annotations; and receiving input from a user modifying one or more annotation.

17. The system of claim 11, wherein the logic device is further configured to annotate the infrared image by applying visible image classification information to the infrared image.

18. The system of claim 11, wherein the logic device is further configured to train a neural network to classify an infrared image using the neural network training dataset including the annotated infrared image.

* * * * *